United States Patent
Rajan et al.

(10) Patent No.: US 9,067,805 B2
(45) Date of Patent: Jun. 30, 2015

(54) WATER FILTERING AND DISPENSING SYSTEM AND SYSTEM FOR FILTERING, STORING, DELIVERING, AND TESTING WATER

(75) Inventors: Rajan G. Rajan, Bensalem, PA (US); Mathu Rajan, Bensalem, PA (US); Raja Rajan, Delcanco, NJ (US); Ken Williams, Middle Island, NY (US)

(73) Assignee: ZERO TECHNOLOGIES, LLC, Bensalem, PA (US)

( * ) Notice: Subject to any disclaimer, the term of this patent is extended or adjusted under 35 U.S.C. 154(b) by 683 days.

(21) Appl. No.: 12/673,147

(22) PCT Filed: Feb. 19, 2009
(Under 37 CFR 1.47)

(86) PCT No.: PCT/US2009/034518
§ 371 (c)(1),
(2), (4) Date: Jun. 9, 2011

(87) PCT Pub. No.: WO2010/019281
PCT Pub. Date: Feb. 18, 2010

(65) Prior Publication Data
US 2012/0048787 A1    Mar. 1, 2012

Related U.S. Application Data

(63) Continuation-in-part of application No. PCT/US2008/073326, filed on Aug. 15, 2008.

(60) Provisional application No. 60/956,123, filed on Aug. 15, 2007.

(51) Int. Cl.
*B01D 35/00* (2006.01)
*B01D 24/38* (2006.01)
(Continued)

(52) U.S. Cl.
CPC .............. *C02F 1/003* (2013.01); *B01D 27/101* (2013.01); *B01D 24/48* (2013.01);
(Continued)

(58) Field of Classification Search
None
See application file for complete search history.

(56) References Cited

U.S. PATENT DOCUMENTS 3,701,364 A * 10/1972 Hare ........................ 137/625.41
3,807,425 A *  4/1974 Boirum et al. ................ 137/110
(Continued)

FOREIGN PATENT DOCUMENTS

| KR | 20-137538 y1 | 3/1999 |
| KR | 10-2003-62838 A | 9/2003 |
| WO | 2005/008989 A1 | 1/2005 |

OTHER PUBLICATIONS

International Preliminary Report on Patentability and Written Opinion of the International Searching Authority dated Feb. 15, 2011 of PCT International Application No. PCT/US2009/034518 filed Feb. 19, 2009.

(Continued)

*Primary Examiner* — Nam Nguyen
*Assistant Examiner* — Richard Gurtowski
(74) *Attorney, Agent, or Firm* — J.A. Lindeman & Co., PLLC

(57) ABSTRACT

The invention provides a water dispensing system comprising a container having a first region adapted to store unfiltered water, a second region adapted to store filtered water, and a spout region, a meter housing adapted to receive a water meter, a reservoir disposed within the first region of the container, a filter coupled to the reservoir, the filter being adapted to filter water flowing from the reservoir into the second region of the container, a valve assembly disposed in the second region of the container, the valve assembly being adapted to dispense filtered water from the second region of the container, and a lid coupled to the reservoir. In addition, the invention provides a system for filtering and testing water, comprising a water filtering system used in combination with a water meter for testing the quality of the effluent.

31 Claims, 5 Drawing Sheets

(51) Int. Cl.
- *B67D 7/76* (2010.01)
- *C02F 1/00* (2006.01)
- *B01D 27/10* (2006.01)
- *B01D 24/48* (2006.01)

(52) U.S. Cl.
CPC .... *C02F 2201/005* (2013.01); *C02F 2201/006* (2013.01); *C02F 2209/04* (2013.01); *C02F 2209/06* (2013.01); *C02F 2209/10* (2013.01); *C02F 2307/04* (2013.01)

(56) References Cited

U.S. PATENT DOCUMENTS

| | | | | |
|---|---|---|---|---|
| 3,856,676 | A | * | 12/1974 | Grimme et al. ............ 210/96.1 |
| 4,771,485 | A | * | 9/1988 | Traylor ........................... 4/678 |
| 5,957,034 | A | * | 9/1999 | Sham et al. .................... 99/285 |
| 6,074,550 | A | | 6/2000 | Hofmann et al. |
| 6,224,751 | B1 | * | 5/2001 | Hofmann et al. ............. 210/85 |
| 6,231,226 | B1 | * | 5/2001 | Neidigh ....................... 366/256 |
| 6,558,537 | B1 | * | 5/2003 | Herrington et al. .......... 210/192 |
| 7,107,838 | B2 | * | 9/2006 | Chai et al. .................. 73/304 R |
| 2002/0121197 | A1 | | 9/2002 | Mercier et al. |
| 2003/0034283 | A1 | | 2/2003 | Tsataros et al. |
| 2003/0196944 | A1 | | 10/2003 | Tanner et al. |
| 2004/0134932 | A1 | * | 7/2004 | Lobdell ........................ 222/146.5 |
| 2006/0249442 | A1 | | 11/2006 | Yap et al. |

OTHER PUBLICATIONS

Translation of Korean Patent Abstract of Application No. 10-2003-0062838, filed Sep. 8, 2003.
International Search Report in PCT Application No. PCT/US2008/073326 dated Dec. 2, 2008.
International Preliminary Report on Patentability in PCT Application No. PCT/US2008/073326 dated Feb. 16, 2010.
International Search Report in PCT Application No. PCT/US2009/034518 dated Feb. 18, 2010.
International Preliminary Report on Patentability in PCT Application No. PCT/US2009/034518 dated Feb. 15, 2011.
Brita 35530 Ultramax Dispenser. Amazon.com, May 5, 2003 [retrieved on Oct. 10, 2014]. Retrieved from the Internet: , URL: http://www.amazon.com/Brita-35530-Ultramax-Dispenser/dp/B00009LHZH>.
HM Digital TDS-EZ Water Quality TDS Tester. Amazon.com, Apr. 4, 2006 [retrieved on Oct. 10, 2014]. Retrieved from the Internet: ,URL: http://www.amazon.com/HM-Digital-TDS-EZ-Measurement-Resolution/dp/B002C0A7ZY/ref=pd_bxgy_hi_img_z>.

\* cited by examiner

WATER FILTERING AND DISPENSING SYSTEM AND SYSTEM FOR FILTERING, STORING, DELIVERING, AND TESTING WATER

RELATED CASE INFORMATION

The present application is a U.S. national phase of PCT Application No. PCT/US2009/034518, filed Feb. 19, 2009, which is a continuation-in-part application of PCT Application No. PCT/US08/73326, filed Aug. 15, 2008, which claims the benefit of priority of U.S. Provisional Patent Application No. 60/956,123, filed Aug. 15, 2007, the disclosures of which are hereby incorporated by reference in their entirety.

BACKGROUND OF THE INVENTION

1. Field of the Invention

The present invention relates to a water filtering and dispensing system, more specifically, to a system for filtering, storing, dispensing, and testing water.

2. Discussion of the Related Art

In general, portable water filtering systems include a container for holding filtered water. Here, the unfiltered water is provided into an upper reservoir disposed within an upper region of the container and flows through a water filter by the force of gravity into a lower region of the container. Usually, the rate of flow of unfiltered water through the water filter is relatively slow compared to the process of filling the upper reservoir with unfiltered water. For example, a user usually fills the upper reservoir with plain tap water from a tap, i.e., kitchen faucet, and waits for the plain tap water to completely flow through the filter and collect in a lower region of the container. In many instances, the total time to filter all of the plain tap water from the filled upper reservoir into the lower region of the container may take at least a few minutes. During such time, the user is prevented from dispensing the filtered water for consumption. Specifically, the user is prevented from dispensing the newly filtered water as it is being filtered, as well as any previously filtered water that may have been presented in the lower region of the container prior to the newly initiated filtering process.

However, sometimes a user may attempt to dispense small amounts of the newly filtered water, or previously filtered water, while the filtering process is ongoing by gently tipping the container. This usually results in transferring some the plain tap water held in the upper reservoir into the filtered water collected/stored in the lower region of the container. Accordingly, this transfer results in contamination of the filtered water with the plain tap water, thereby defeating the purpose of filtering the water. Thus, a system is needed that allows a user to immediately begin consuming the filtered water, or previously filtered water, without the possibility of contamination of the filtered water with the plain tap water.

Presently, most users of portable water filtering systems place the container holding the filtered water into a refrigerator in order to maintain the filtered water at a cool temperature. Accordingly, the user will store the portable water filtering system in the refrigerator and remove the entire system to dispense the filtered water into a cup or glass for consumption. Then, the user will return the system back into the refrigerator until the next sequence of dispensing the filtered water. Additionally, the user will periodically refill the upper reservoir with additional plain tap water to resupply the system with newly filtered water. However, as most users know, the repeated removal of the system from the refrigerator usually results in minor water spills from dispensing region of the system, as well as collisions with other items stored within the refrigerator. Accordingly, a system is needed that allows a user to easily dispense filtered water from the container without removing the system from the refrigerator.

In general, portable water filtering systems are used to remove various substances inherently included in publicly available water supplies in order to provide "purified" water for consumption. For example, most off-the-shelf portable water filtering systems include filters that remove harmful dissolved chemical compounds, but do little to remove dissolved solids. Moreover, these systems fail to provide an actual analytic measurement of the filtering efficiency of the filter to indicate to the user that the filter needs changing. In many instances, the manufacturers of these systems calculate a useable lifetime for the filter based upon an estimated usage by the user. Here, the consumer is either provided with some type of visual indicator, such as a date label applied to the exterior of the container, or finds out that the filter needs changing when the taste of the filtered water is unacceptable. In the former case, the consumer may unnecessarily replace the filter too soon before it becomes ineffective in filtering the water. In the later case, the user is subjected to a rather unpleasant experience at a time when the user would like to drink filtered water. In either case, the consumer is never provided with a real-time indication that the filter needs to be replaced. Accordingly, there is a need to provide a user with a system for filtering, storing, delivering, and testing water.

Moreover, the quality of filtration generally deteriorates over the life of the filter. To ensure filter life remains at an effective level, most filtration systems rely on a gallon counter or a mechanical or digital calendar system to measure filter life. These types of gauges of filter life do not provide any sort of accurate measure of the actual quality of the water leaving the filter. Thus, there is also a need for a water filtration system that allows users to accurately test the quality of the effluent of the filter.

SUMMARY OF THE INVENTION

Accordingly, the present invention is directed to a water pitcher system and a system for filtering, storing, delivering, and testing water that substantially obviates one or more of the problems due to limitations and disadvantages of the related art.

An object of the present invention is to provide a water pitcher system capable of providing and dispensing filtered water during the water filtration process.

Another object of the present invention is to provide a system for filtering, storing, delivering, and testing water.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a water dispensing system is disclosed herein, the water dispensing system comprising a container having a first region adapted to store unfiltered water, a second region adapted to store filtered water, a spout region, a meter housing adapted to receive a water meter, a reservoir disposed within the first region of the container, a filter coupled to the reservoir, the filter being adapted to filter water flowing from the reservoir into the second region of the container, a valve assembly disposed in the second region of the container, the valve assembly being adapted to dispense filtered water from the second region of the container, and a lid coupled to the reservoir.

In addition, the invention relates to a system for filtering and testing water, comprising a water filtering system including a container having a first region adapted to store unfiltered water, a second region adapted to store filtered water, a spout region, at housing adapted to receive a water meter, a reservoir disposed within the first region of the container, a filter coupled to the reservoir, the filter being adapted to filter water flowing from the reservoir into the second region of the container, a valve assembly disposed in the second region of the container, the valve assembly being adapted to dispense filtered water from the second region of the container, and a lid coupled to the reservoir to form a water compartment within the reservoir, and a water meter disposed within the meter housing for testing the quality of the effluent of the filter to determine a filtering efficiency of the filter.

In each of these systems, the container may include a handle assembly, which may also include a grip portion adapted to improve a user's grip on the handle. In addition, the handle assembly may also include the valve assembly. The valve assembly may be of the type selected from a needle valve, a ball valve, a butterfly valve, a gate valve, and a globe valve. Moreover, the valve assembly preferably includes an actuation portion adapted to be actuated by a user, thereby causing water to be dispensed from the second region of the container. The actuation portion may be, for example, a push or pull button, a lever, or a screw cap. The valve assembly may also include a valve stem having a first end extending into the container and a second end coupled to the actuation portion. The first end of the valve stem may include a sealing member biased against an interior sidewall of container by a spring to control the flow of the filtered water out of the container.

The meter housing may be disposed anywhere within the container. For example, the meter housing may be disposed at least partially within the reservoir, the lid, or the handle. In addition, the meter housing may be positioned at any orientation relative to the container, including, for example, substantially parallel to a direction of the flow of water through the filter and substantially perpendicular to a direction of the flow of water through the filter. The meter housing may also be adapted to receive any suitable type of water meter, including, for example, a total dissolved solids meter, a pH meter, or an oxidation reduction potential meter.

The systems of the invention may further include liners for lining the first region, the second region, and/or the reservoir.

The systems of the invention may further include a utility compartment disposed at least partially within the lid. The utility compartment may be adapted to receive any suitable item related to the system, including, for example, liners. The utility compartment may include the meter housing and receive the meter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
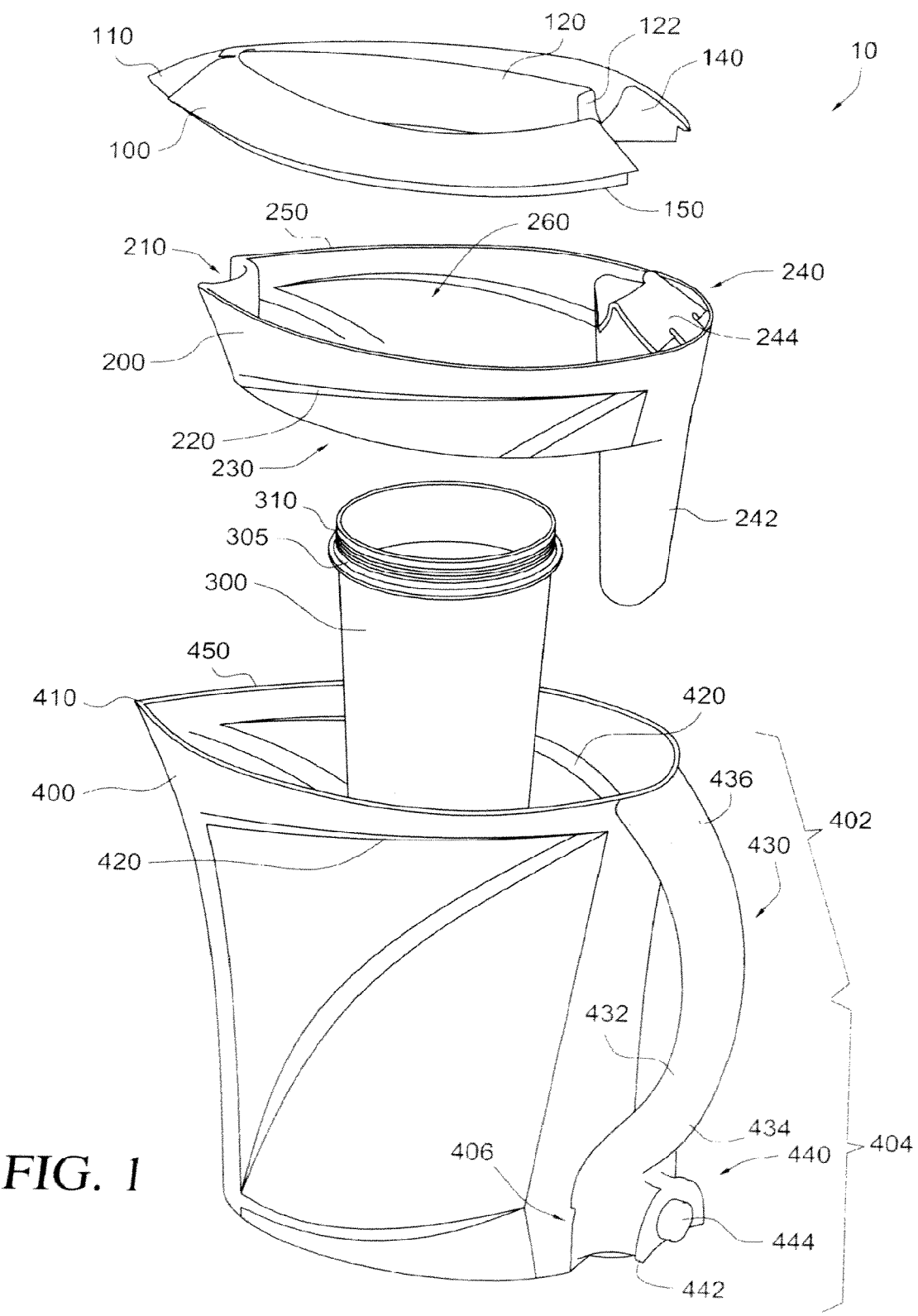
FIG. 1 is an assembly view of an exemplary water pitcher system according to the present invention.

FIG. 1 is an assembly view of an exemplary water dispensing system according to the present invention. In FIG. 1, an exemplary water pitcher system generally includes a container 400, a reservoir 200, a reservoir lid 100, which is preferably a removable lid, and a filter 300. The container 400 includes substantially curved outer and inner surfaces, and includes a first region 402 adapted to store unfiltered water, a second region 404 adapted to store filtered water, a spout region 410, reservoir supports 420 disposed along the inner surface of the container 400, a handle assembly 430, and a valve system 440.

The container 400 may be formed from material or materials sufficient to provide a user with a visual indication as to the volume of water contained in a second region 404 of the container and provide sufficient mechanical strength to support the weight of the filtered water contained in the second region 404, as well as the weight of the unfiltered water contained in an first region 402 of the container 400 and the water undergoing the filtering process through the filter 300. Here, the unfiltered water contained in the first region 402 corresponds to the unfiltered water contained in the reservoir 200, as detailed below. For example, the material(s) for the container may include transparent plastics or glass.

The handle assembly 430 includes an inner portion 432 made from the same material(s) as the container 400 that extends from the first region 402 to the second region 404 of the container 400. In addition, the handle assembly 430 includes an outer portion 434 coupled to an outer surface of the inner portion 432 and an insert portion 436 disposed along an outer surface of the outer portion 434. Here, the outer portion 434 may be formed of material(s) similar or different from the material(s) used to form the container 400. For example, the outer portion 434 may be formed of a relatively compliant material(s) to conform to a user's hand, and the insert portion 436 may be formed of compliant material(s) that provide improved friction with a user's hand, thereby providing improved grip.

Valve system 440 allows a user to dispense water from container 400 without requiring a user to lift or tilt container 400 as is required by many existing portable filtration systems. In addition, valve system 440 enables users to dispense water without removing container 400 from its storage location, for example, on a shelf in a refrigerator. Thus, it is easy for any user to dispense water from container 400, including, for example, young children, elderly persons, or persons with physical disabilities. Valve system 440 is disposed at a terminal end 436 of the handle assembly 430 to control dispensing of the filtered water contained within the second region 404 of the container 400. The valve system 440 includes components formed as a part of the container 400, as detailed below.

In an alternative configuration (not shown), the water dispensing system may further include liners adapted to line first region 402, second region 404, and/or reservoir 200. These liners may be formed of any suitable material, such as rigid or flexible plastics, and may be reusable or disposable. For example, the liners may be disposable plastic bags or the like. Liners may be preferable in some systems to minimize contamination resulting from the container itself and to reduce the need to clean the container. Liners may also allow the container to be formed of an alternative material, such as metal or a fibrous material.

In FIG. 1, the reservoir 200 includes a flow opening 210 corresponding to the spout region 410 of the container that allows the filtered water to be dispensed from the container 400 by a user when the container 400 is tipped toward a cup or glass using the handle assembly 430. The reservoir 200 is nested inside the first region 402 of the container 400, wherein reservoir recesses 220 engage the reservoir supports 420. Accordingly, upper edge portions 250 of the reservoir 200 are substantially flush with, or slightly recessed below, upper edge portions 450 of the container 400 to substantially seal the container 400, except for the spout region 410.

Figure 2:
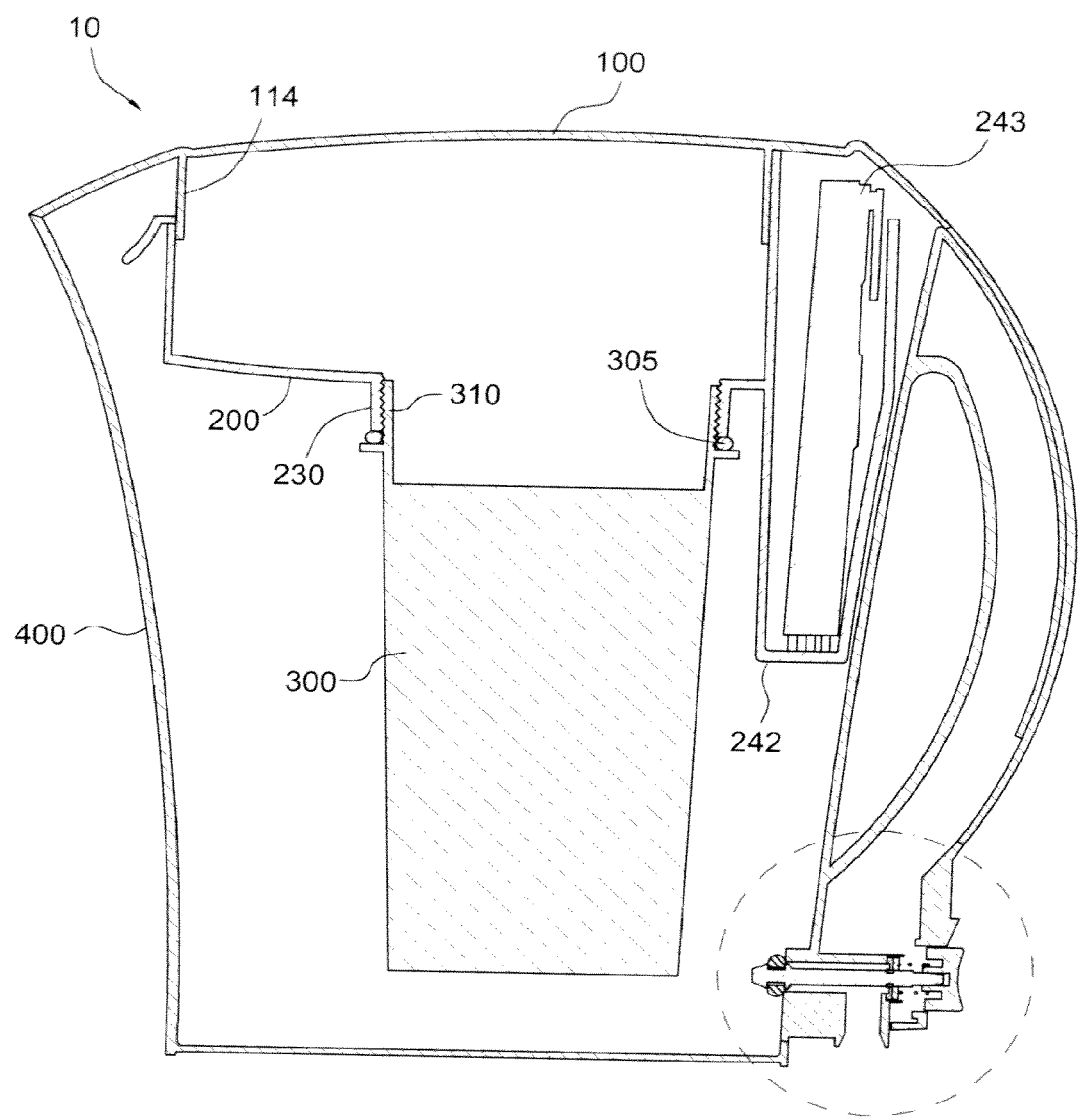
FIG. 2 is across-Sectional view of FIG. 1 of the exemplary water pitcher system according to the present invention.

The reservoir 200 further includes a meter housing region 240 that houses a total dissolved solids (TDS) meter 243 in, a meter housing 242 (in FIG. 2). The TDS meter is intended to be an included accessory that allows consumers to measure the effluent from the filter, which allows for a direct and exact measurement of the quality of the filtered water. While the exemplary embodiments described herein use a TDS meter, it should be understood that alternative methods of testing the effluent may used be used. For example, other suitable meters or diagnostic equipment may measure other characteristics indicative of the quality of the effluent instead of, or in addition to, TDS, including, for example, pH, oxidation reduction potential (ORP), and the like. Examples of handheld water meters can be found at "http://hmdigital.com".

As shown in FIG. 2, the TDS meter 243 may be disposed completely within the meter housing 242, and sealed-off from the container 400, as well as a water compartment 260 of the reservoir 200 that receives the water that will undergo the filtering process. In addition, the reservoir 200 includes a compartment cover 244 that further seals the meter housing 242 to an exterior of the system 10. The cover 244 may correspond to a lid recess region 140 of the lid 100, as in FIG. 1, thus allowing a user to easily reach into the meter housing 242 and remove the TDS meter 243 from the system 10 without having to remove the lid 100. In various embodiments, the cover 244 may be attached to the assembly, for example a hinged cover as depicted in FIG. 1, or it may be removable, for example a cap-like cover as in FIG. 4.

While the meter housings depicted herein are of a rectangular shape, adapted to receive a rectangular or pen shaped meter, the housing may be adapted to receive any shape of meter or diagnostic device. For example, in alternative configurations, the meter housing may be circular, such that it may be able to receive a disk-like or spherical meter or device, square, diamond, or any other form.

In accordance with the embodiment of FIG. 1, the user would dispense the filtered water into a cup or glass, remove the TDS meter 243 from the meter housing 242 after removing the cover 244, remove the protective cap from the probe end of the TDS meter 243, and insert the probe end into the filtered water dispensed into the cup or glass. Of course, the user could first remove the TDS meter 243 and then dispense the filtered water. In either case, the user would conveniently have the TDS meter 243 available as part of the system 10 rather than storing the TDS meter 243 in a separate location from hereby risking the possibility of losing or damaging the IDS meter 243.

In alternative configurations, lid 100 may extend at least partially over meter housing 242 and cover 244, thereby allowing a user access to the TDS meter 243 only after the lid 100 has been removed. In a preferred embodiment, for example, that depicted in FIG. 4, the meter housing 242 and cover 244 are completely covered by lid 100, and thus, is only exposed after lid 100 has been removed from reservoir 200.

Figure 5:
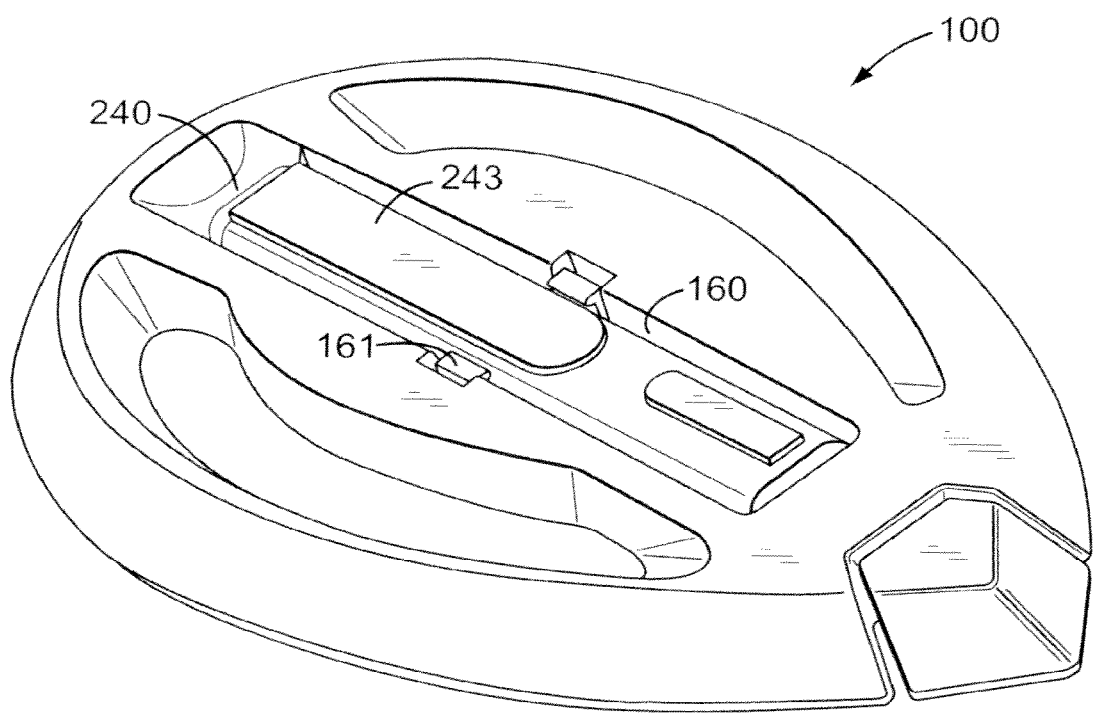
FIG. 5 is a view of a lid comprising a meter housing of an exemplary water pitcher system according to the present invention.

In an alternative configuration shown in FIG. 5, the TDS meter 243 is disposed entirely within the lid 100, and is sealed-off from the container 400, as well as the water compartment 260 of the reservoir 200 that receives the water that will undergo the filtering process. In the embodiment of FIG. 5, the meter housing region 240 is disposed in the top or exterior of the lid 100. The TDS meter 243 resides in a recess region 160 of the lid 100. In the embodiment of FIG. 5, the TDS meter 243 is exposed to the exterior of the system 10: therefore, a compartment cover 244 (see FIG. 1) is optional and not depicted in FIG. 5. In the absence of a compartment cover, as in FIG. 5, the TDS meter 243 may be secured in the recess region 160 using conventional mechanisms, for example, but not limited to, friction fit, snap fit, Velcro, latch, or magnetic connection. In the exemplary embodiment of FIG. 5, the TDS meter 243 is secured in the recess region 160 using a snap fit comprising two latches 161 for receiving the TDS 243. The configuration of FIG. 5 allows a user to easily remove the TDS mete 241 from the system 10 without having to remove the lid 100 or a meter housing cover 244 (see FIG. 1). This exemplary configuration may also provide easy cleaning and drying of the meter housing 242 and meter 243 as they are disposed on the exterior of the system 10 and exposed to the open air. This configuration, which lacks an meter housing cover, may also provide easy cleaning and drying of the entire lid.

In an alternative configuration not depicted herein, the TDS meter 243 may be disposed on the underside of the lid, i.e., on the interior of the system, opposite the reservoir 200. In such a configuration, the meter housing 242 may be sealed off from the water compartment 260 of the reservoir 200 by a compartment cover 244.

When the meter housing is in the lid, as in FIG. 5, it may be oriented substantially perpendicular to a direction of the flow of water through the filter. In alternative configurations, the meter housing may be oriented substantially parallel to a direction of the flow of water through the filter.

The user would utilize a system wherein the TDS meter 243 is disposed in the lid 100 in the same manner as for other configurations described herein.

As a result of testing the filtered water, the user would have an analytic measurement with which to determine the filtering efficiency of the filter 300. For example, the user may test the filtered water to ensure that the analytical measurement using the TDS meter 243 indicates that the amount of TDS in the water is less than a predetermined acceptable amount, for example, 6 ppm (parts per million). While it should be understood that there may be some solids that arise from other sources, such as the container itself, 6 ppm is a generally acceptable amount of IDS in the effluent. Higher or lower values may also be considered to be acceptable by the user. If the analytical measurement using the TDS meter 243 is greater than the acceptable amount, then the user would know to replace the existing filter 300 with a new filter 300. Here, the exemplary 6 ppm limit takes into consideration that the cup or glass may not been completely free of solid contaminants prior to the dispensing of the filtered water from the container 400. Moreover, the exemplary 6 ppm limit also takes into consideration any contamination that may have occurred from the ambient storage conditions of the system 10.

Thus, for whatever the reasons for the substances that cause the water to be contaminated or impure, the filter 300 is preferably replaced when a test of the filtered water is greater than the acceptable amount. Different types of filters may be used depending on the varying types of substances that may be found in the unfiltered water. Suitable exemplary filters are described in U.S. Pat. No. 5,635,063, issued Jun. 3, 1997, U.S. Pat. No. 6,572,769, issued Jun. 3, 2003, U.S. Pat. No. 7,276,161, issued Oct. 2, 2007, and U.S. patent application Ser. No. 11/847,015, filed Aug. 28, 2007, for example. In the alternative, any compatible filter capable of removing substances from the water during filtration to cause the TDS to be less that the predetermined acceptable amount may be used.

Figure 4:
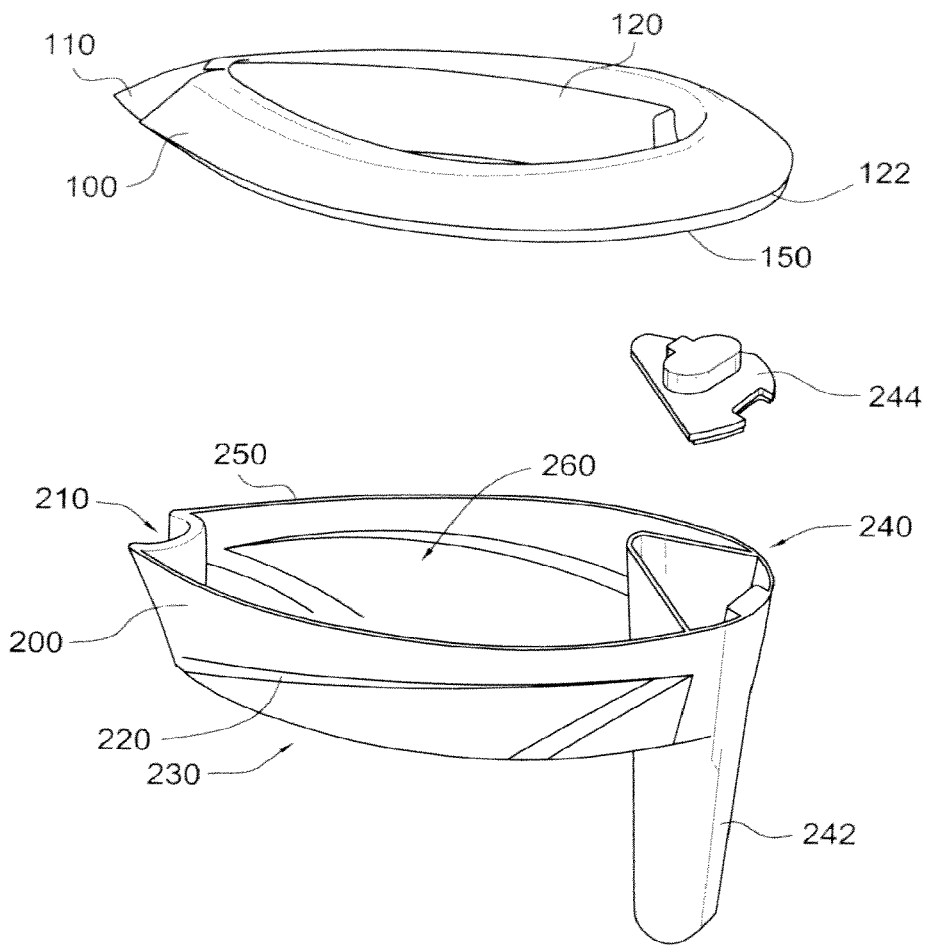
FIG. 4 is a view of a reservoir and a lid of an exemplary water pitcher system according to the present invention.

Once the test is completed, the user would then place the TDS meter 243 back into the meter housing 242 and seal the meter housing 242 using the cover 244, when present. Moreover, when present, the cover 244 may include an internal recessed region that corresponds to the geometry of the cover of the TDS meter 243. Here, removing the cover 244 would automatically withdraw the TDS meter 243 from the meter housing 242. Alternatively, the lid 100 may be formed to omit the lid recess region 140, such that the TDS meter 243 would have to be retrieved by removing the lid 100 and the cover 244, as depicted in FIG. 4. As another alternative, the TDS meter 243 may be stored in the lid, along an underside portion 122 or outer portion 120 of the lid 100, or may be stored within the handle assembly 430.

In FIG. 1, the lid 100 includes a flange skirt 150 that, when engaged with the upper edge portions 250 of the reservoir 200, substantially seals the water compartment 260 of the reservoir 200, except for the filter 300. Accordingly, when filtered water is dispensed from the second region 404 of the container 400, the filtered water flows through the flow opening 210 and past a lid cover 110 without being reintroduced into the water compartment 260. More importantly, unfiltered water in the water compartment 260 is not allowed to flow out of the sealed reservoir 200 and be dispensed into the cup or glass. In at least one embodiment, substantially all of the unfiltered water is prevented from flowing out of the sealed reservoir 200. As shown in FIG. 2, the lid 100 includes a flow harrier portion 114 that engages an internal surface of the reservoir 200 at the flow opening 210 to prevent the passage of the unfiltered water in the water compartment 260 into the flowing opening 210.

Reservoir 200 further includes an internally threaded opening 230 that engages the external threaded portion 310 of the filter 300. While a threaded engagement between reservoir 200 and filter 300 is preferred to ensure a water tight seal, it should be understood that any suitable means for engagement may be used, including, for example, a press-fit engagement from above or inside the reservoir 200. Preferably, the filter 300 is sealed to the reservoir 200 using a sealing ring 305 to ensure that water may only pass from the water compartment 260 of the reservoir 200 into the second region 404 of the container 400 through the filter 300. Sealing ring 305 may be any type of sealing ring capable of creating a water tight seal between filter 300 and reservoir 200. In a preferred embodiment, sealing ring 305 is an o-ring, or sealing gasket, made of a flexible material, such as rubber. An exemplary sealing ring may be formed of a material such as silicone rubber, having a Durometer hardness of approximately 35.

As shown in FIG. 2, the filter 300 is disposed within the second region 404 of the container 400 and may be immersed within the filtered water contained in the second region 404 of the container 400. Although some of the filtered water in the second region 404 of the container 400 may be free to flow back into the Filter 300 due to movement of the system 10, no unfiltered water in the water compartment 260 may flow into the second region 404 of the container without first undergoing the filtering process through the filter 300. Moreover, placing the filter 300 within the second region 404 of the container 400 will regulate be flow of filtered water accumulated in the second region 404, thereby preventing overflow of the filtered water out through the flow opening 210. For example, although a user may accidentally overfill the water compartment 260, such that the second region 404 of the container 400 may already be filled to capacity with filtered water, further flow of filtered water into the second region 404 of the container 400 may be prevented by the filter 300 until an adequate amount of the previously filtered water is dispensed from the second region 404 of the container 400.

Figure 3:
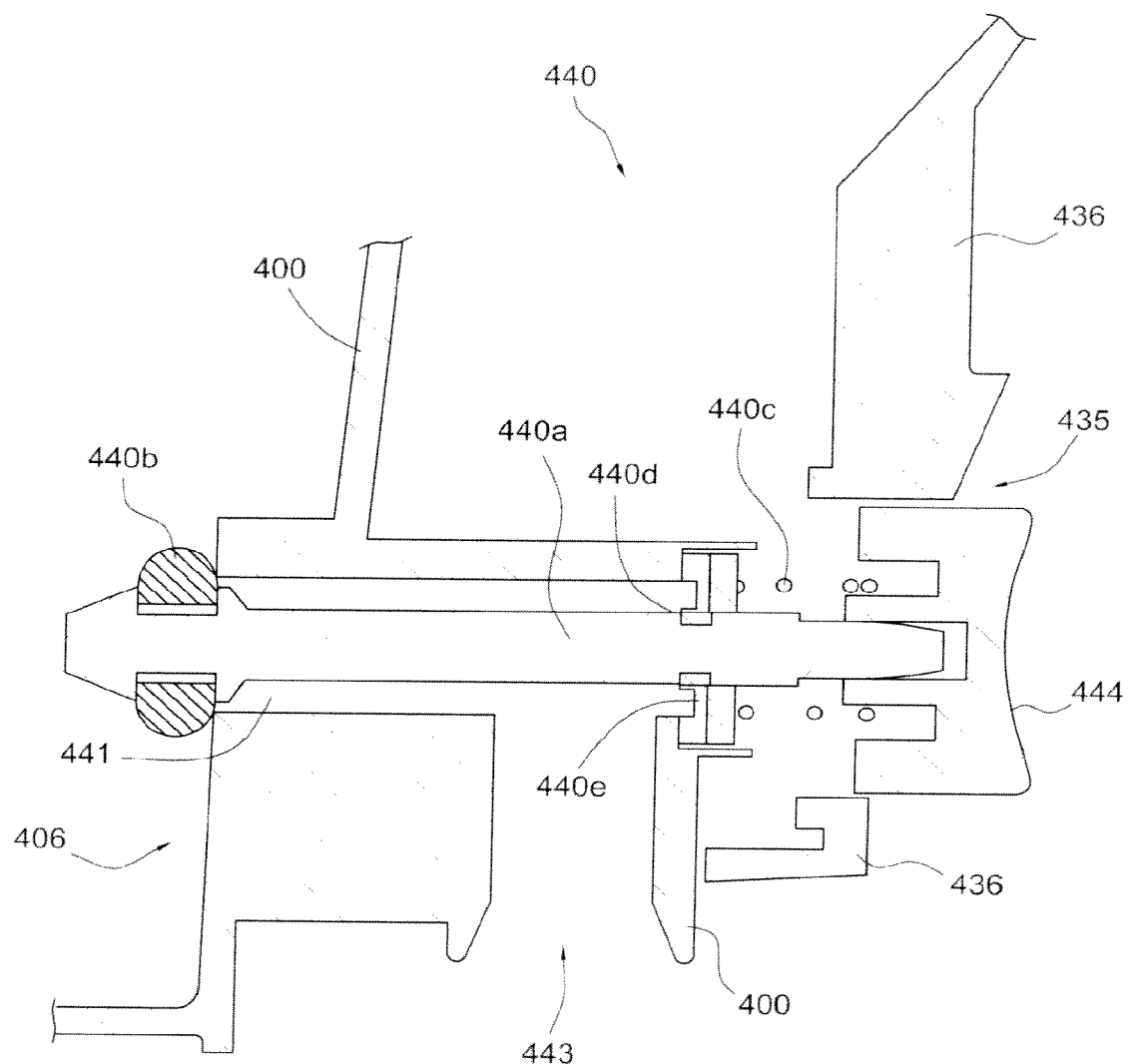
FIG. 3 is an enlarged cross-sectional view of an exemplary valve system according to the present invention.

FIG. 3 is an enlarged cross-sectional view of an exemplary valve system according to the present invention. In FIG. 3, the valve system 440 includes the push button 444 disposed within an opening 435 to extend from the insert portion 436. As shown in FIG. 1, the valve system 440 includes a flange portion 442 that allows a user to conveniently depress the push button 444 using their thumb while placing the user's index and middle behind the flange portion 442 in order to dispense the filtered water from the container 400 without having to significantly move the system 10. Here, the flange portion 442 may be integrally formed with the outer portion 434 of the handle assembly 430.

The valve system 440 further includes a valve stem 440a having a first end coupled to a sealing member 440b, which is disposed within the container 400, and a second end coupled to an interior of the push button 444. A mid-region of the valve stem 440a includes an external sealing member 440d. Accordingly, when the push button 444 is depressed inwardly toward the container 400, a return spring 440c is compressed and the sealing member 440b disengages from an internal sidewall 406 of the container 400. As a result, the filtered water within the container 400 flows through past the sealing member 440b and through a flow orifice 441 out through an outlet 443.

Upon releasing the depressed push button 444, the return spring 440c repositions the valve stem 440a to its initial position such that the sealing member 440b is seated against the internal sidewall 406, thereby preventing the flow of filtered water through the flow orifice 441 and out of the outlet 443. Moreover, the external sealing member 440d, supported by the backing washer 440e, mates with and creates a seal with the container 400, thereby preventing the flow of filtered water outward toward the push button 444.

In FIG. 3, although the outlet 443 is shown to be substantially perpendicular to the flow orifice 441, the outlet 443 may actually be disposed at an acute angle with regard to the movement direction of the valve stem 440a. Accordingly, the flow of filtered water through the valve system 440 may be provided in a direction away from the container 400.

In accordance with the present invention, other embodiments may include alternative valve configurations provided that they are disposed at a bottom portion of the container, preferably at a lower portion adjacent to the handle assembly. For example, the valve configuration may alternatively be as a needle valve, a ball valve, a butterfly valve, a gate valve, a globe valve, and the like. As detailed above, the relative positioning of the valve system allows a user to immediately begin consuming the filtered water, or previously filtered water, without the possibility of contamination of the filtered water with the plain tap water.

In accordance with the present invention, other embodiments may include alternative valve locations provided that they are disposed at a bottom portion of the container, preferably at a lower portion of the system. As detailed above, the relative positioning of the valve system allows a user to easily dispense filtered water from the container without removing the system from the refrigerator.

In accordance with the present invention, other embodiments may include alternative filter locations and titter configurations provided that an analytical measurement may be easily and quickly made of the filtered water. As detailed above, the user is presented with a single system that provides for filtering, storing, delivering, and testing water.

The systems of the invention may further include a utility compartment disposed at least partially within the lid, which is not depicted herein. The utility compartment may be adapted to receive any suitable item related to the system, including, for example, liners. The utility compartment may include the meter housing and receive the meter.

It will be apparent to those skilled in the art that various modifications and variations can be made in the water pitcher system and system for filtering, storing, delivering, and testing water of the present invention without departing from the spirit or scope of the invention. Thus, it is intended that the present invention cover the modifications and variations of this invention provided they come within the scope of the appended claims and their equivalents.

What is claimed is:

1. A water dispensing system for dispensing filtered water during a water filtration process, the system comprising:
   a container having a first region adapted to store unfiltered water, a second region below the first region and adapted to store filtered water, and a spout region extending from the second region through a flow opening in a reservoir in the first region and adapted to dispense filtered water from the second region;
   a meter housing adapted to receive a water purity meter;
   the reservoir disposed within the first region of the container, the reservoir including a water compartment and the flow opening;
   a lid with a flange skirt coupled to an upper edge portion of the reservoir that seals the water compartment of the reservoir preventing unfiltered water from flowing out of the reservoir;
   a utility compartment;
   a filter disposed within the second region of the container and coupled to the reservoir, the filter being adapted to filter water flowing from the reservoir into the second region of the container and to regulate the flow of filtered water accumulated in the second region preventing overflow of the filtered water through the flow opening of the reservoir; and
   a valve assembly disposed at an opposing side of the container from the spout region and at a terminal end of a handle assembly in the second region of the container, the valve assembly including a filtered water outlet adapted to dispense filtered water from the second region of the container and the valve assembly positioned in a bottom portion of the second region of the container to dispense the filtered water through the filtered water outlet without moving the water dispensing system while the unfiltered water flows through the filter.

2. The system of claim 1, wherein the lid includes a flow barrier portion that engages an internal surface of the reservoir at the flow opening to prevent the passage of unfiltered water in the water compartment into the flow opening.

3. The system of claim 1, wherein the valve assembly is disposed at least partially within the handle assembly.

4. The system of claim 1, wherein the valve assembly is of the type selected from a needle valve, a ball valve, a butterfly valve, a gate valve, and a globe valve.

5. The system of claim 1, wherein the valve assembly includes a flange portion and an actuation portion adapted to be actuated by a user, thereby causing water to be dispensed from the second region of the container without moving the system.

6. The system of claim 5, wherein the actuation portion is selected from the group consisting of a push button, a lever, and a screw cap.

7. The system of claim 5, wherein the valve assembly includes a valve stem having a first end extending into the container and a second end coupled to the actuation portion.

8. The system of claim 7, wherein the first end of the valve stem includes a sealing member biased against an interior sidewall of the container by a spring to control the flow of the filtered water out of the container.

9. The system of claim 1, wherein the meter housing is disposed within at least one of a top recess region in the lid and the utility compartment.

10. The system of claim 1, wherein the reservoir includes reservoir recesses and the container includes reservoir supports, and the reservoir recesses engage the reservoir supports to substantially seal the container, except for the flow opening of the reservoir.

11. The system of claim 1, wherein the meter housing further comprises a mechanism for securing a water meter chosen from friction fit, snap fit, Velcro, latch, or magnetic connection.

12. The system of claim 1, wherein the meter housing is disposed at least partially within the handle assembly.

13. The system of claim 1, further comprising;
   a water purity meter for storage within the meter housing.

14. The system of claim 1, wherein the meter housing is disposed on an underside of the lid opposite the reservoir.

15. The system of claim 1, wherein the lid includes a lid recess region adapted to provide access to the utility compartment without removing the lid from the reservoir.

16. The system of claim 1, further comprising one or more liners for lining at least one of the first region, the second region, and the reservoir.

17. A system for filtering and testing water, comprising:
   a water filtering system including:
      a container having a first region adapted to store unfiltered water, a second region below the first region and adapted to store filtered water, and a spout region extending from the second region through a flow opening in a reservoir in the first region and adapted to dispense filtered water from the second region;
      a meter housing adapted to receive a water purity meter;
      the reservoir disposed within the first region of the container, the reservoir including a water compartment and the flow opening;
      a lid with a flange skirt coupled to an upper edge portion of the reservoir that seals the water compartment of the reservoir preventing unfiltered water from flowing out of the reservoir;
      a utility compartment;
      a filter disposed within the second region of the container and coupled to the reservoir, the filter being adapted to filter water flowing from the reservoir into the second region of the container and to regulate the flow of filtered water accumulated in the second region preventing overflow of the filtered water through the flow opening of the reservoir;

a valve assembly disposed at an opposing side of the container from the spout region and at a terminal end of a handle assembly in the second region of the container, the valve assembly including a filtered water outlet adapted to dispense filtered water from the second region of the container and the valve assembly positioned in a bottom portion of the second region of the container to dispense the filtered water through the filtered water outlet without moving the water dispensing system while the unfiltered water flows through the filter; and a water purity meter disposed within the meter housing for testing a quality of an effluent of the filter to determine a filtering efficiency of the filter.

18. The system of claim 17, wherein the lid includes a flow barrier portion that engages an internal surface of the reservoir at the flow opening to prevent the passage of unfiltered water in the water compartment into the flow opening.

19. The system of claim 17, wherein the valve assembly is disposed at least partially within the handle assembly.

20. The system of claim 17, wherein the valve assembly is of the type selected from a needle valve, a ball valve, a butterfly valve, a gate valve, and a globe valve.

21. The system of claim 17, wherein the valve assembly includes a flange portion and an actuation portion adapted to be actuated by a user, thereby causing water to be dispensed from the second region of the container without moving the system.

22. The system of claim 21, wherein the actuation portion is selected from the group consisting of a push button, a lever, and a screw cap.

23. The system of claim 21, wherein the valve assembly includes a valve stem having a first end extending into the container and a second end coupled to the actuation portion.

24. The system of claim 23, wherein the first end of the valve stem includes a sealing member biased against an interior sidewall of the container by a spring to control the flow of the filtered water out of the container.

25. The system of claim 17, wherein the meter housing is disposed within at least one of a top recess region in the lid and the utility compartment.

26. The system of claim 17, wherein the reservoir includes reservoir recesses and the container includes reservoir supports, and the reservoir recesses engage the reservoir supports to substantially seal the container, except for the flow opening of the reservoir.

27. The system of claim 17, wherein the meter housing further comprises a mechanism for securing a water meter chosen from friction fit, snap fit, Velcro, latch, or magnetic connection.

28. The system of claim 17, wherein the meter housing is disposed at least partially within the handle assembly.

29. The system of claim 17, wherein the meter housing is disposed on an underside of the lid, opposite the reservoir.

30. The system of claim 17, wherein the lid includes a lid recess region adapted to provide access to the utility compartment without removing the lid from the reservoir.

31. The system of claim 17, further comprising one or more liners for lining at least one of the first region, the second region, and the reservoir.

* * * * *